Figure 1:
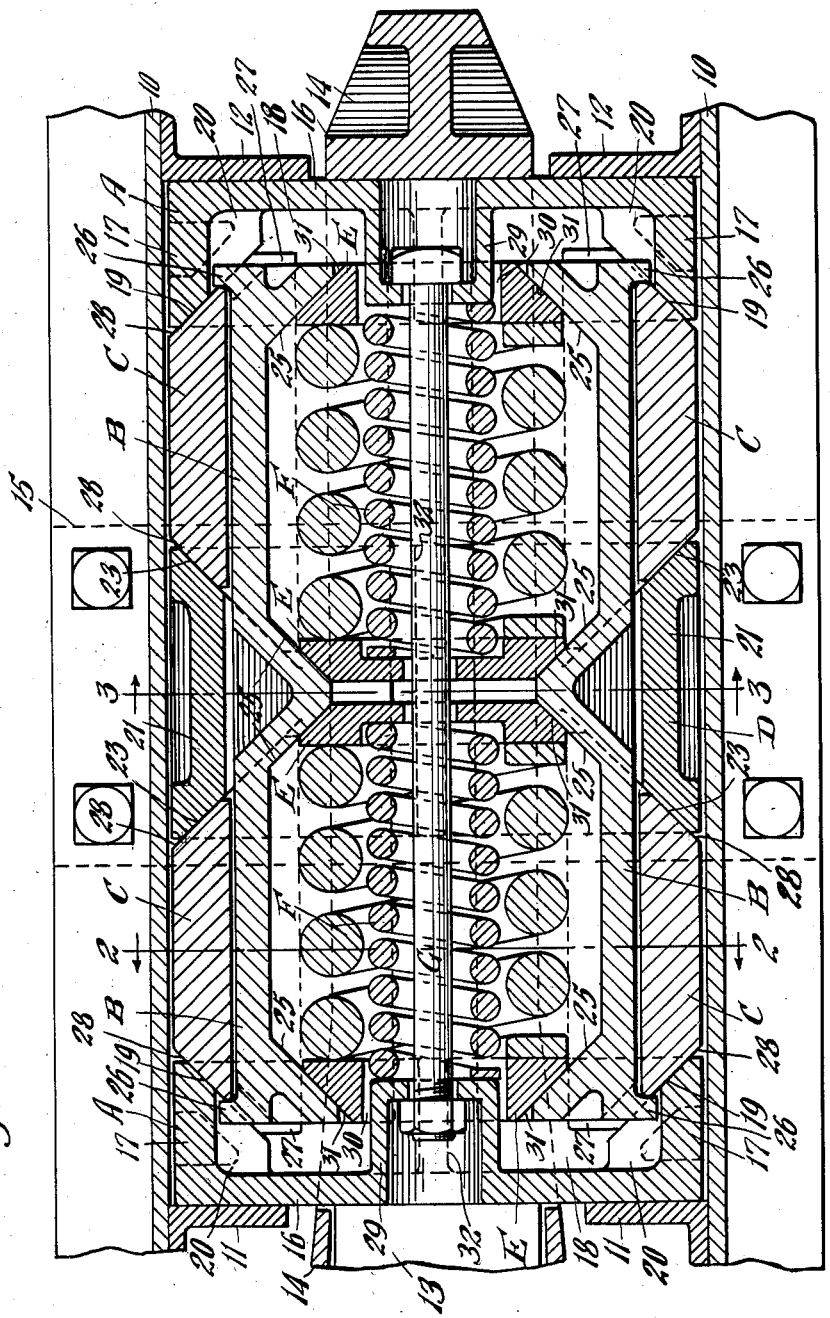

Aug. 7, 1934.   S. B. HASELTINE   1,968,942
FRICTION SHOCK ABSORBING MECHANISM
Filed May 8, 1930   2 Sheets-Sheet 1

Witness
Wm. Geiger

Inventor
Stacy B. Haseltine
By Joseph Harris
His Atty.

Aug. 7, 1934. S. B. HASELTINE 1,968,942
FRICTION SHOCK ABSORBING MECHANISM
Filed May 8, 1930 2 Sheets-Sheet 2
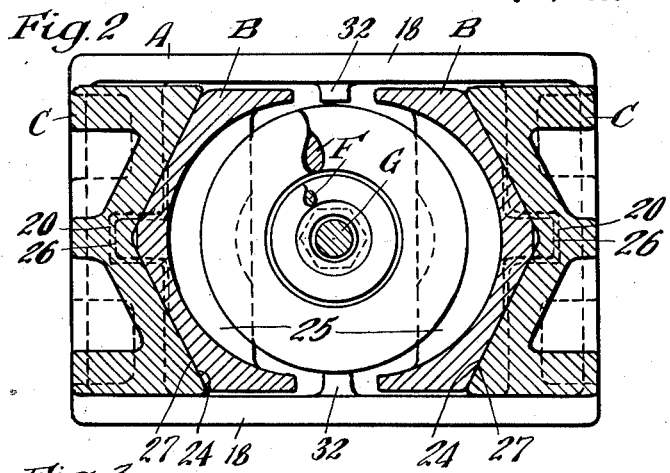
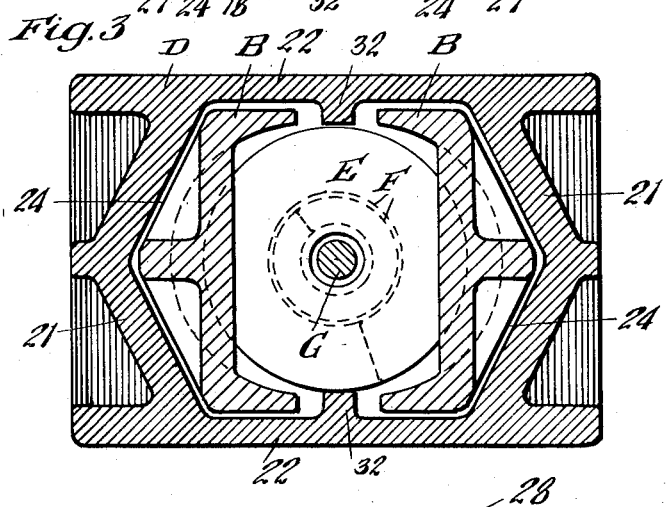
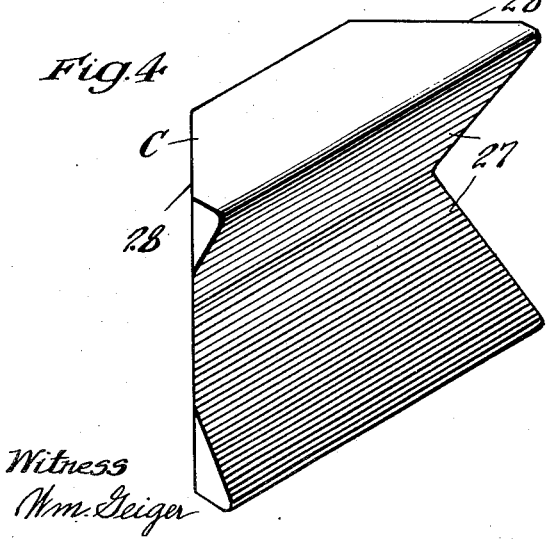
Inventor
Stacy B. Haseltine
By Joseph Harris
His Atty.
Witness
Wm. Geiger Patented Aug. 7, 1934

1,968,942

UNITED STATES PATENT OFFICE 1,968,942

FRICTION SHOCK ABSORBING MECHANISM

Stacy B. Haseltine, Chicago, Ill., assignor to W. H. Miner, Inc., Chicago, Ill., a corporation of Delaware Application May 8, 1930, Serial No. 450,636

4 Claims. (Cl. 213—39)

This invention relates to improvements in friction shock absorbing mechanisms.

One object of the invention is to provide a simple and efficient friction shock absorbing mechanism especially adapted for railway draft riggings, having exceptionally high capacity produced by a plurality of relatively movable friction elements presenting cooperating friction areas of relatively large size.

A more specific object of the invention is to provide a friction shock absorbing mechanism including a pair of side members movable laterally toward each other during compression of the mechanism, resisted by spring means extending lengthwise of the mechanism, the spring means being compressed between spring follower members having wedging engagement with the side members, wherein the side members are moved laterally toward each other by a wedge friction system including relatively movable follower members and friction members interposed between said follower members and having wedging engagement therewith, the friction members having frictional engagement with the side members and being movable lengthwise thereof during compression of the mechanism, and being forced laterally inwardly by the wedging engagement with the followers to force the side members toward each other.

A still further object of the invention is to provide in a mechanism of the character specified in the preceding paragraph, simple and efficient means for maintaining the parts assembled, including interengaging V-shaped faces on the friction members and side members for guiding the friction members lengthwise of the mechanism and maintaining the alinement thereof with respect to the side members, the friction members being telescoped within the front and rear followers.

Another object of the invention is to provide a friction shock absorbing mechanism including front and rear follower casings and a central floating wedge casing, all having interior opposed wedge faces; a pair of side members extending lengthwise of the mechanism and movable laterally toward each other during compression of the gear; two pairs of friction elements disposed at opposite ends of the mechanism in embracing relation to the side members and each having wedging engagement with the wedge faces of one of said main followers and the central casing to be wedged laterally inwardly thereby; spring means at opposite ends of the mechanism, compressible lengthwise thereof, spring followers cooperating with each spring means and having wedging engagement with interior wedge means on the side members.

Yet another object of the invention is to provide a mechanism of the character indicated in the preceding paragraph, wherein the side members have their opposite ends extending into the follower casings and the friction elements are guided for movement lengthwise of the mechanism and are held against vertical displacement with respect to the side members by providing the same with friction surfaces of interengaging V-shape section, the friction elements also extending into the front and rear followers and wedge casing and wherein means is provided for limiting relative separation of the main followers, thereby maintaining all of the parts assembled.

In the drawings, forming a part of this specification, Figure 1 is a horizontal, sectional view through the underframe structure of a railway car illustrating my improvements in connection therewith. Figures 2 and 3 are vertical, transverse, sectional views corresponding respectively to the lines 2—2 and 3—3 of Figure 1. And Figure 4 is a detailed, perspective view of one of the wedge friction elements of my improved mechanism.

In said drawings, 10—10 designate the usual channel shaped center or draft sills of a railway car underframe, to the inner faces of which are secured front stop lugs 11—11 and rear stop lugs 12—12. The inner end of the coupler shank is designated by 13 and has secured thereto a yoke member 14 of well known design, within which my improved friction shock absorbing mechanism is supported. The yoke in turn is supported by a detachable saddle plate 15 secured to the bottom flanges of the draft sills.

My improved shock absorbing mechanism proper comprises broadly front and rear follower casings A—A; side friction members B—B; two pairs of friction wedge elements C—C and C—C; a central floating wedge casing D; two sets of spring followers E—E and E—E; two main spring resistance elements F—F; and a retainer bolt G.

The front and rear followers A are of similar design, each cooperating with the corresponding pair of stop lugs of the draft sills in the usual manner. Each follower casing A has a transverse outer vertical end wall 16, spaced vertical side walls 17—17 and horizontally disposed spaced top and bottom walls 18—18. The side walls 17 are provided with interior opposed wedge faces 19—19, each wedge face being longitudinally, centrally slotted, as indicated at 20, for a purpose hereinafter pointed out.

The floating central wedge casing D is open at opposite ends and has side walls 21—21 and horizontal top and bottom walls 22—22. The side walls are of substantially V-shape section, as clearly shown in Figure 3, and are provided on their inner sides with front and rear wedge faces 23—23. The side walls are suitably reinforced by longitudinally extending ribs, as clearly illustrated in Figure 3. The interior surfaces of the side walls are of substantially V-shape formation, as will be seen upon reference to Figure 3, so as to accommodate the side members B—B.

The side members B—B are of like design, each being provided with a longitudinally disposed V-shape friction surface 24 on the outer side thereof adapted to cooperate with the corresponding friction wedge elements C—C. The side friction members B extend through the casing D and have their front and rear ends extending into the front and rear follower casings. At each end on the inner side thereof, each side member B is provided with an interior wedge face 25, the wedge faces of the two members B—B being opposed. Centrally of the members B, the same are provided with inwardly projecting enlargements having front and rear wedge faces thereon which are also designated by 25—25. Between the sets of wedge faces 25—25 of each member B, the inner wall portions thereof are cut away so as to accommodate the main spring resistance element F, these walls being rounded, as clearly shown in Figure 2, and sufficient clearance being provided between the same and the outer coil of the spring resistance, in the normal full release position of the parts, to permit the necessary relative approach of the members B—B during compression of the gear. At the outer side at each end thereof, each member B has a laterally outwardly projecting retaining lug 26 which cooperates with the corresponding wedge friction element C in order to effect centering of the member B after each actuation of the gear. The lugs 26 are accommodated in the slots 20—20 of the wedge faces of the front and rear follower casings A—A.

The friction wedge elements C are four in number and are arranged in pairs at opposite ends of the mechanism, the members of each pair being disposed on opposite sides of the side members B—B. The members C are all of like design, each having a V-shaped interior friction surface 27 extending lengthwise thereof and cooperating with the V-shaped friction surface 24 at the corresponding end of the cooperating side member B. Each element C is interposed between one of the main followers A and the central floating casing D, and has wedge faces 28—28 at opposite ends thereof corresponding respectively with the interior wedge faces 23 and 19 of the central floating casing and the main follower A at the corresponding end of the gear. As will be clearly seen upon reference to Figure 1, each of the friction wedge elements C is of such a length that it extends both into the floating casing D and the corresponding main follower A in the full release position of the parts. As will be evident, by telescoping the front and rear followers A over the corresponding ends of the side members B and of the corresponding friction wedge elements C and also telescoping the floating casing D over the inner ends of the friction wedge elements C, all of the parts of the mechanism are held assembled and against relative displacement in a vertical direction. In addition, by providing the cooperating V-shaped friction surfaces on the friction wedge elements and side members B, these parts are interlocked against relative vertical movement, thereby further adding to the rigidity of the gear.

The two spring resistance elements F—F are disposed respectively at the front and rear ends of the mechanism, between the two side members B—B, each spring resistance comprising a relatively light inner coil and a heavier outer coil. The outer coil has its opposite ends bearing on the corresponding spring followers E—E and the inner coil has its inner end bearing on the inner spring follower E of the corresponding set and has the opposite end bearing on an inwardly projecting hollow boss 29 on the corresponding main follower A, the corresponding spring follower E being provided with a central opening 30, which freely receives the hollow boss.

The spring followers E—E of each spring resistance element F have wedging engagement with the side members B—B, each spring follower being provided with a pair of wedge faces 31—31 on opposite sides thereof, which cooperate with the corresponding wedge faces 25—25 of the side members B, the innermost spring follower E of each set engaging the wedge faces on the central inward enlargements on the side members and the outer spring follower engaging the wedge faces 25 at the corresponding ends of the side members B—B.

In order to maintain the springs centered vertically, between the top and bottom walls of the front and rear followers and also between the top and bottom walls of the floating casing D, these top and bottom walls are provided with interior, longitudinally disposed ribs 32—32, as clearly shown in Figures 2 and 3.

The entire mechanism is held assembled by the retainer bolt G, which has its head anchored within the hollow boss 29 of the rear follower A and the nut thereof disposed within the hollow boss 29 of the front follower A, the shank of the bolt extending through the inner coils of the spring resistance elements F and alined openings in the inner spring followers E—E and the bosses 29—29. In addition to holding the mechanism assembled, the retainer bolt is so adjusted that the main spring resistance members F—F are under an initial compression, thereby compensating for wear of the various friction and wedge faces of the mechanism, sufficient clearance being provided between the side members B—B and the side walls of the floating casing and front and rear followers A—A to permit lateral outward movement of the members B—B as wear takes place on the cooperating friction surfaces of the members B and the friction wedge elements C—C and on the cooperating wedge faces of the elements C and the front and rear follower casings and central casing D.

The operation of my improved friction shock absorbing mechanism during either a buff or draft action is as follows. The main follower A at one end of the mechanism will be forced inwardly toward the main follower A at the other end thereof, thereby wedging the friction elements C—C at opposite ends of the mechanism laterally inwardly. Due to the longitudinal compression of the mechanism, the cooperating wedge faces of the floating casing D and the friction wedge element C will be active at this time to force the inner ends of the elements C laterally inwardly. Due to the lateral inward movement of the friction elements C, the two side members B will be forced laterally inwardly toward each other also, thereby wedging the spring followers E—E of the front and rear sets inwardly of each other lengthwise of the mechanism and compressing the main spring resistance elements F, the outer coils of the springs being compressed through the wedging action of the spring followers, and the inner coils being compressed at their outer ends by engagement with the front and rear followers, while being compressed at their inner ends by the inner spring followers E—E. Due to the relative approach of the two main followers A and the sliding movement of the friction wedge elements C—C on the wedge faces of the main followers and floating casing D, the friction elements C will slide longitudinally on the friction surfaces of the side members B—B, thereby providing a certain amount of frictional resistance. In addition to the frictional resistance provided between the members C and B, friction will also be created between the sliding wedge faces of the members C, the front and rear followers A—A and the floating casing D. This friction is further augmented by the frictional resistance between the wedge faces of the members B—B and the spring followers E—E, due to the relative sliding movement thereof during compression of the mechanism.

In release, when the actuating force is reduced, the expansive action of the two main spring resistance elements F—F forces the spring followers apart, thereby wedging the side members laterally outwardly, these members in turn forcing the friction wedge members laterally outwardly and the latter wedging the main followers A—A and the floating casing so as to restore the same to the normal full release position shown in the drawings, the retainer bolt G limiting the outward movement of the main followers A—A. In addition to the restoring action of the spring resistance elements F—F referred to, the central coils of the spring resistance elements act to directly restore the main followers A—A to their outermost position by engagement with the bosses 29—29 thereof. During the restoring action, the friction wedge elements C will also effect centering of the side members B—B between the front and rear followers by engagement of the outer ends of the front and rear friction elements C—C with the corresponding restoring lugs 26—26 of the side members.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with front and rear followers; of a casing disposed between said followers; friction elements disposed lengthwise of the mechanism at opposite sides thereof and having wedging engagement with said followers and casing whereby said members are forced laterally inwardly upon relative approach of said followers; cooperating means on said side members and friction elements for centering said side members between said followers when the mechanism is released; and means between said side members opposing relative approach thereof.

2. In a friction shock absorbing mechanism, the combination with spaced side members extending lengthwise of the mechanism, said side members having interior wedge means at opposite ends thereof and also intermediate said ends; of front and rear spring resistance elements extending lengthwise of the side members; spring follower members at opposite ends of each of said spring resistance elements, one of the spring follower elements of each spring resistance having wedging engagement with said intermediate means of the side members and the other spring follower of said spring resistance having wedging engagement with the wedge means at the corresponding end of the mechanism; friction elements at opposite sides of said side members slidable lengthwise thereof; and wedge means including front and rear followers, said wedge means having wedging engagement with said friction elements for wedging the same laterally inwardly against said side members and forcing the side members toward each other to compress said spring resistance.

3. In a friction shock absorbing mechanism, the combination with front and rear followers; of a casing disposed between said followers; spaced side members extending lengthwise of the mechanism, said side members having interior wedge means at opposite ends thereof and also intermediate said ends; front and rear spring resistance elements extending lengthwise of the side members; spring follower members at opposite ends of each of said spring resistance elements, one of the spring followers of each spring resistance having wedging engagement with said intermediate wedge means of the side members and the other spring follower of said spring having wedging engagement with the wedge means of the side members at the corresponding end of the mechanism; friction elements disposed lengthwise of the mechanism at opposite sides thereof and having wedging engagement with said followers and casing, whereby said side members are forced laterally inwardly upon relative approach of said followers, said friction elements having sliding frictional engagement with the side members.

4. In a friction shock absorbing mechanism, the combination with spaced side members extending lengthwise of the mechanism, said side members having interior wedge means at opposite ends thereof and also intermediate said ends; of front and rear spring resistance elements extending lengthwise of the side members; spring follower members at opposite ends of each of said spring resistance elements, one of the spring follower elements of each spring resistance having wedging engagement with said intermediate wedge means of the side members and the other spring follower of said spring resistance having wedging engagement with the wedge means at the corresponding end of the mechanism, said side members having exterior friction surfaces; friction elements at opposite sides of the mechanism having frictional engagement with said side members and movable lengthwise thereon; and means for wedging said friction elements laterally inwardly, said means including front and rear follower casings having wedging engagement with the friction elements and a floating wedge casing interposed between said follower casings also having wedging engagement with said elements.

STACY B. HASELTINE.